April 3, 1951  C. D. WILLIAMS  2,547,299
TRAILER HITCH

Filed June 23, 1949  2 Sheets-Sheet 1

INVENTOR
C. D. WILLAMS
BY Geo. Stevens
ATTORNEY

April 3, 1951  C. D. WILLIAMS  2,547,299
TRAILER HITCH
Filed June 23, 1949  2 Sheets-Sheet 2

INVENTOR.
C. D. WILLIAMS
BY Geo Stevens
ATTORNEY

Patented Apr. 3, 1951

2,547,299

UNITED STATES PATENT OFFICE 2,547,299

TRAILER HITCH

Calvin D. Williams, Cloquet, Minn.

Application June 23, 1949, Serial No. 100,849

3 Claims. (Cl. 280—33.44)

This invention relates to trailer hitches and has special reference to one which is foldable out of sight when not in use.

One of the principal objects of my invention is to provide a trailer hitch for cars and the like which may be hidden from view when not in use and which will be out of the way rather than protruding where it may cause damage to other vehicles or objects which may be contacted thereby during ordinary use of the car.

Another object is to provide means to support a ball type trailer hitch so that heavy loads may be pulled, in addition to the fold away features above mentioned.

Another object is to provide means to return the trailer hitch in either folded or unfolded position without objectionable rattling in either position.

These and other objects and advantages will become more apparent as the description of the invention proceeds.

In the accompanying drawing forming a part of this application:

Figure 2:
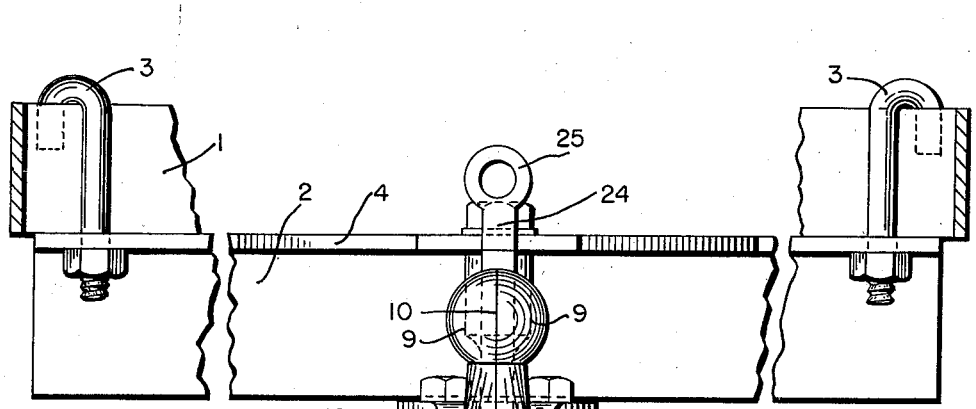
Fig. 2 is a rear elevational view of Fig. 1 with the bumper removed.

In the drawing, the reference numerals 1—1 indicate the spaced, spring steel, members which support the bumper O of a vehicle such as an automobile. The numeral 2 indicates an angle iron beam which is secured transversely of the supports 1—1 as shown, preferably, by means of the hook bolts 3, and a horizontal projection 4 is fixed to the angle iron beam to carry the trailer hitch parts.

The trailer hitch comprises a vertically disposed plate 5 which is preferably longitudinally adjustably carried by the member 4 as by stud bolts 6 which extend through slots 7 in the member 4 and into tapped sockets 8 which are fixed to the plate 5. This arrangement permits longitudinal adjustment so that the ball 9 of the hitch may be positioned properly when the hitch is used on different makes of vehicles.

The hitch ball 9 is split longitudinally preferably centrally thereof as at 10, and the two parts thereof are carried by similar substantially L-shaped arms 11—11, the longer legs of the arms being disposed horizontally, and the shorter legs vertically, when in use, to support the ball in the desired position to receive the hitch socket which is carried by the trailer. It is to be noted that the trailer hitch socket (not shown) will serve to hold the parts of the ball 9 assembled when in use.

Each of the arms 11 has a pair of spaced laterally projecting lugs 12 at its remote end which provides means for forming a horizontally pivotal union with its respective short, vertically pivotal arm 13, the latter being carried on opposite sides of the plate 5, and each having an eye 14 to receive the bolt or pin 15 which also extends through the lugs 12, and may be threadedly held in the lower one of the lugs 12. The arms 13 are secured together by a pin 16 which extends through the plate 5 and provides a vertical pivot for the arms 13.

It may be seen from the above, that the two parts of the hitch ball 9 and arms 11 may be swung outwardly, away from each other, on the pin 15, and may be swung downwardly together on the pin 16. In order to permit the two halves of the ball to come together and form a circular hitch connection, and still maintain the pivotal ends of the arms 11 on opposite sides of the plate 5, the arms 11 are bent outwardly slightly adjacent the plate as at 17 to straddle the plate 5.

Each of the arms 11 has a hole 18 therethrough and a pin 19 projects laterally from each side of the plate 5 and is received in the hole 18 when the halves of the ball 9 are together to hold the arms 11 and the hitch ball in their deserved relationship to the vehicle when the hitch is in use.

Figure 1:
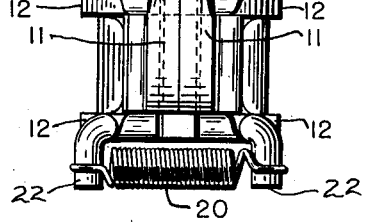
Fig. 1 is a side elevational view of one of my trailer hitches showing same installed on a vehicle.
Figure 1:
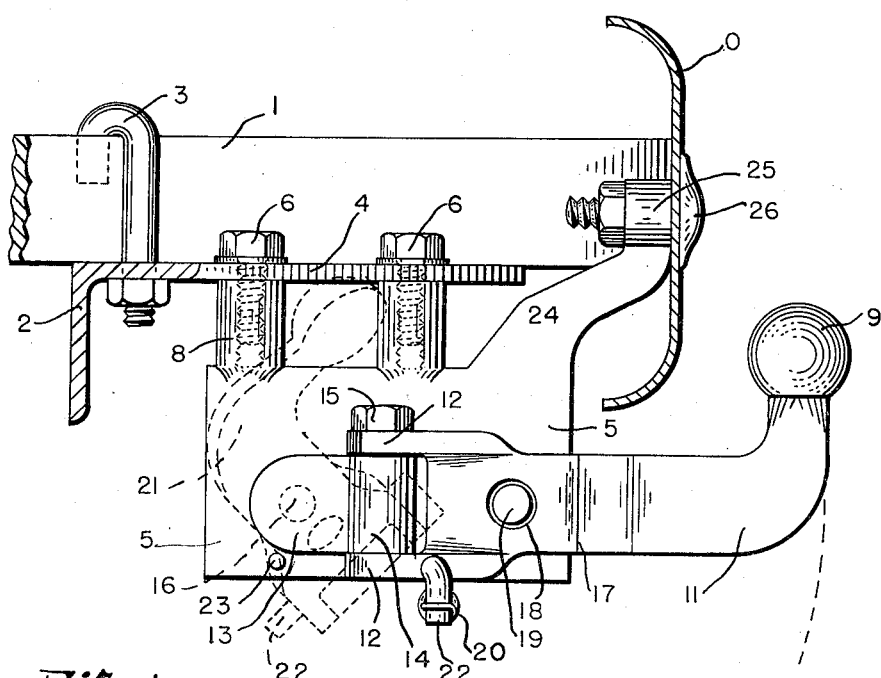
Figure 3:
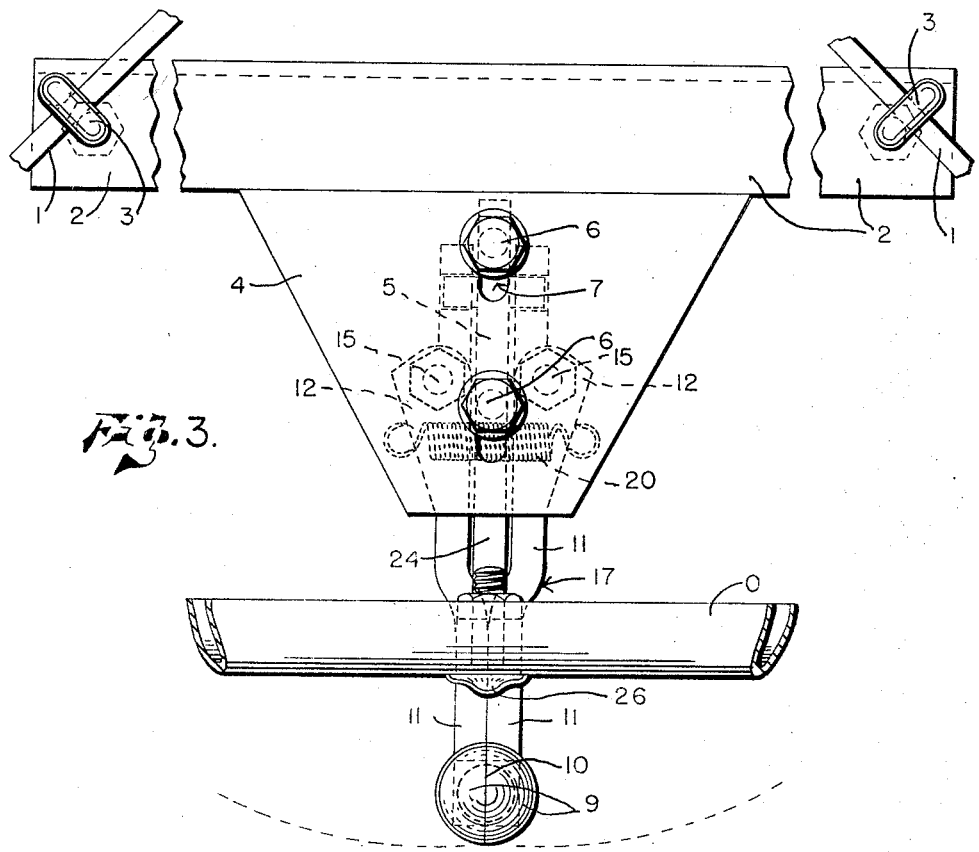
Fig. 3 is a top plan view of Fig. 1.
Figure 4:
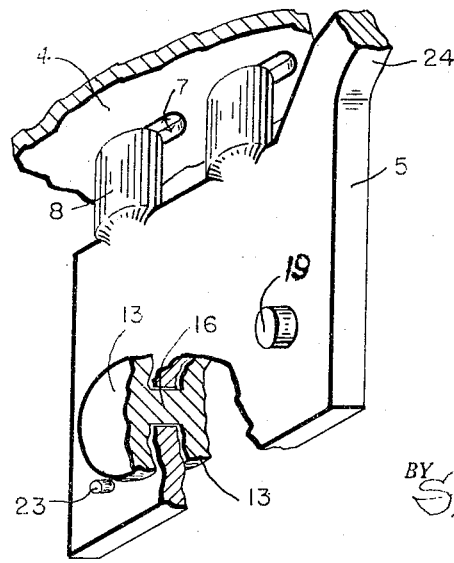
Fig. 4 is a broken perspective view showing the vertical spine member and the mounting for the vertically pivotal portion of the hitch carrying arm.

A contractile spring 20 is provided to hold the arms 11 either in closely assembled relation or in open relation as shown in dotted lines at 21. This is accomplished by installing the spring on depending lugs 22 forwardly of the hinge pin 15 on each of the arms 11 and this will, obviously, bias the arms toward each other. When the arms 11 and the ball parts 9 are in outward or spread relation, and the arms 11 and 13 pivoted downwardly on the pin 16 as shown in dotted lines at 21, Fig. 1, the lugs 22 pass beyond the center of the pivot pins 15, and the spring 20 extends between the lugs 22 rearwardly of the pins 15 and thus holds the arms 11 in open condition.

It is deemed apparent that both horizontal and vertical swingable movement of the ball halves is provided so that the ball may be moved under the bumper O of a car and out of sight, it being necessary to carry the ball sufficiently high off of the ground to receive a trailer hitch connection properly.

In operation; with my invention mounted on a vehicle as shown and the parts of the hitch ball 9 and arms 11 in abutting relation and the pins 19 extending within their respective holes 18; a trailer hitch may readily be engaged on the ball 9 for pulling a trailer or the like, and this will hold the ball together as well as prevent the arms 11 from spreading so that the pins 19 cannot be released from the holes 18. It will be readily seen that under these conditions there is no possibility of the hitch parts moving from their proper relationship.

When the hitch ball is not in use, the ball 9 and arms 11 may be spread apart sufficiently to release the pins 19 from the holes 18, then the arms 11 and 13 may be swung downwardly on the pin 16 until the ball is below the lower extremity of the bumper O, then the arms 11 may be spread further apart until they are beyond directly opposed position so that the spring 20 may hold same in spread or open relation. A stop 23 is provided on each side of the plate 5 adjacent the arms 13 to limit the downward movement of the latter so that the ball may clear the lower extremity of the bumper but the arms will not drop too far so as to be difficult to manage when folding or unfolding the hitch. These stops also hold the arms of the hitch in their desired position when folded and prevent their depending too far below the bumper level, of course.

If desired an extension 24 may be provided on the plate 5 and an eye 25 formed thereon whereby the plate may be secured to the vehicle bumper O as by the bolt 26 which is usually present centrally on most vehicle bumpers. This will reenforce the attachment of the hitch to the vehicle, as is obvious.

It is deemed apparent from the above, that I have provided a novel and convenient tuck-away trailer hitch ball connection.

Having thus described my invention, what I claim is:

1. A trailer hitch for attachment to a vehicle having a bumper comprising a hitch ball formed of two substantially semi-spherical parts carried in abutting relation, an arm for carrying each of said parts, said arms being vertically and horizontally swingably mountable under said vehicle inwardly of said bumper whereby said parts may be folded under said vehicle beneath said bumper when not in use and will extend outwardly of said bumper when in use.

2. A trailer hitch for attachment to vehicles to receive the hitch member carried by the tongue of a trailer comprising an upright plate having means to be secured to said vehicle, a pair of relatively short arms vertically pivotally carried on said plate one on each side thereof, a longer arm carried by each of said short arms in substantial alinement with each other and extending beyond said plate, each of said longer arms having a semi-spherical member extending from their outer ends, and said longer arms being carried closely adjacent each other adjacent their outer ends so that said semi-spherical members form a single substantially spherical hitch ball connection, means to hold said arms in their desired vertical relation, and said longer arms being laterally swingable connected to said shorter arms to release said holding means whereby said longer arms may be spread outwardly and moved downwardly beneath the vehicle on which they are carried to hide them from view.

3. The structure as set forth in claim 2 to spring means to bias said arms in either abutting or spread relation.

CALVIN D. WILLIAMS.

REFERENCES CITED

The following references are of record in the file of this patent:

UNITED STATES PATENTS

| Number | Name | Date |
|---|---|---|
| 2,408,531 | Riemann et al. | Oct. 1, 1946 |